(12) United States Patent
Fu et al.

(10) Patent No.: US 12,495,352 B2
(45) Date of Patent: Dec. 9, 2025

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Zhe Fu, Guangdong (CN); Shukun Wang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 364 days.

(21) Appl. No.: 18/188,058

(22) Filed: Mar. 22, 2023

(65) Prior Publication Data

US 2023/0224798 A1 Jul. 13, 2023

Related U.S. Application Data

(63) Continuation of application No. PCT/CN2020/118972, filed on Sep. 29, 2020.

(51) Int. Cl.
*H04W 76/20* (2018.01)
*H04W 48/02* (2009.01)
*H04W 84/04* (2009.01)

(52) U.S. Cl.
CPC ........... *H04W 48/02* (2013.01); *H04W 76/20* (2018.02); *H04W 84/042* (2013.01)

(58) Field of Classification Search
CPC ... H04W 48/02; H04W 76/20; H04W 84/042; H04W 48/14; H04W 76/18; H04W 48/06; H04W 76/30
See application file for complete search history.

(56) References Cited

U.S. PATENT DOCUMENTS

2014/0126469 A1 5/2014 Youtz et al.
2022/0330006 A1* 10/2022 Zhu ................. H04W 68/00

FOREIGN PATENT DOCUMENTS

CN 110235470 A 9/2019
CN 111066346 A 4/2020
(Continued)

OTHER PUBLICATIONS

3GPP (3rd Generation Partnership Project; Technical Specification Group Services and System Aspects; System architecture for the 5G System (SGS); Stage 2 (Release16), 3GPP Standard; 3GPP TS 23.501, vol. SA WG2, No. V16.6.0, Sep. 24, 2020 (Sep. 24, 2020).*
(Continued)

*Primary Examiner* — Lakeram Jangbahadur
(74) *Attorney, Agent, or Firm* — Ladas & Parry LLP

(57) ABSTRACT

Embodiments of the present disclosure provide a wireless communication method, a terminal device, and a network device, which are applied in a field of communication technology. The embodiments of the present disclosure include: receiving a first indication information sent by a network device, where the first indication information is used to prevent a terminal device from an access attempt or camping, and the first indication information includes at least one of following information: wait time information, applicable range information, and a common use indication.

20 Claims, 3 Drawing Sheets

(56) References Cited

FOREIGN PATENT DOCUMENTS

| EP | 3654692 A1 | * | 5/2020 | ............. H04L 47/28 |
| EP | 3709707 A1 | | 9/2020 | |

OTHER PUBLICATIONS

3GPP17 ("3rd Generation Partnership Project; Technical Specification Group Core Network and Terminals; Non-Access-Stratum (NAS) protocol for 5G System (5GS); Stage 3; (Release 17)", vol. CT WG1, No. V17.0.0 Sep. 25, 2020 (Sep. 25, 2020), pp. 1-729).*

The first Office Action of corresponding European application No. 20955569.7 dated Apr. 18, 2024.

International Search Report(ISR) dated Jun. 25, 2021 for Application No. PCT/CN2020/118972.

Written Opinion(WOSA) dated Jun. 25, 2021 for Application No. PCT/CN2020/118972.

Huawei, HiSilicon, "Infinite De-registration attempt" C1-205279, 3GPP TSG-CT WG1 Meeting #125-e, Electronic meeting, Aug. 20-28, 2020.

3GPP TS 38.331 V16.1.0 (Jul. 2020), 3rd Generation Partnership Project; Technical Specification Group Radio Access Network;NR-;Radio Resource Control (RRC) protocol specification(Release 16).

The EESR of corresponding European application No. 20955569.7 dated Sep. 28, 2023.

3GPP TS 24.501 V17.0.0 (Sep. 2020), 3rd Generation Partnership Project; Technical Specification Group Core Network and Terminals; Non-Access-Stratum (NAS) protocol for 5G System (5GS); Stage 3; (Release 17).

3GPP TS 23.501 V16.6.0 (Sep. 2020), 3rd Generation Partnership Project; Technical Specification Group Services and System Aspects; System architecture for the 5G System (5GS); Stage 2 (Release 16).

* cited by examiner

WIRELESS COMMUNICATION METHOD, TERMINAL DEVICE, AND NETWORK DEVICE

CROSS-REFERENCE TO RELATED APPLICATIONS

This application is a continuation of International Application No. PCT/CN2020/118972, filed on Sep. 29, 2020, the disclosure of which is hereby incorporated by reference in its entirety.

TECHNICAL FIELD

The present disclosure relates to a field of communication technology, in particular to a wireless communication method, a terminal device, and a network device.

BACKGROUND

During a radio resource control (RRC) connection establishment procedure, a network device can only know slicing information required by a terminal device after receiving the RRC connection establishment completion message (i.e. msg5). However, the slicing information required by the terminal device may not be the slicing supported by the network device, or the slicing is overloaded even though it is the slicing supported by the network device, at this time, the network device can only send an RRC release message to the terminal device after the msg5, and the network device can indicate in the RRC release message that no access attempt should be made any more in a current cell for a period of time. The RRC release message only instructs the terminal device not to make an access attempt for the current cell, however, according to the slicing deployment in the R17 communication standard, a network slicing is usually the same in one area (such as the TA area) or frequency point. That is to say, if the network slicing is not supported in this current cell, it should also not be supported in an area or frequency point corresponding to the current cell. According to an existing indication mode, after the current cell access fails, the terminal device may make another access attempt in the area or the frequency point corresponding to the current cell, which will cause unnecessary behavior overhead of the terminal device and constantly trigger a connection establishment or a recovery process, resulting in high power consumption of the terminal device and the network device.

SUMMARY

Embodiments of the present disclosure provide a wireless communication method, a terminal device, and a network device, which can avoid the problems of the terminal device constantly triggering the connection establishment or the recovery process, resulting in high power consumption of the terminal device and the network device.

A first aspect provides a wireless communication method, including: receiving a first indication information sent by a network device, where the first indication information is used to prevent a terminal device from an access attempt or camping, and the first indication information includes at least one of following information:
wait time information, applicable scope information, and a common use indication.

A second aspect provides a wireless communication method, including: sending a first indication information to a terminal device, where the first indication information is used to prevent the terminal device from an access attempt or camping, and the first indication information includes at least one of following information:
wait time information, applicable scope information, and a common use indication.

A third aspect provides a terminal device, including:
a receiving module, configured to receive first indication information sent by a network device, where the first indication information is used to prevent a terminal device from an access attempt or camping, and the first indication information includes at least one of following information:
wait time information, applicable scope information, and a common use indication.

A fourth aspect provides a network device, including: a sending module, configured to send a first indication information to a terminal device, where the first indication information is used to prevent the terminal device from an access attempt or camping, and the first indication information includes at least one of following information:
wait time information, applicable scope information, and a common use indication.

A fifth aspect provides a terminal device, including: a receiver, configured to receive first indication information sent by a network device, where the first indication information is used to prevent a terminal device from an access attempt or camping, and the first indication information includes at least one of following information:
wait time information, applicable scope information, and a common use indication.

A sixth aspect provides a network device, including: a transmitter, configured to send a first indication information to a terminal device, where the first indication information is used to prevent the terminal device from an access attempt or camping, and the first indication information includes at least one of following information:
wait time information, applicable scope information, and a common use indication.

A seventh aspect provides a computer readable storage medium, including: a computer instruction, when it is operated on a computer, the computer is enabled to perform the method according to the first aspect or any possible implementation of the first aspect, or perform the method according to the second aspect or any possible implementation of the second aspect.

An eighth aspect provides a computer program product, including: a computer instruction, when the computer instructions are operated on a computer, the computer operates the computer instruction to cause the computer to perform the method according to the first aspect or any possible implementation of the first aspect, or perform the method according to the second aspect or any possible implementation of the second aspect.

A ninth aspect provides a chip, the chip is coupled with a memory in a terminal device to cause the chip call a program instruction stored in the memory, so as to make the terminal device to perform the method according to the first aspect or any possible implementation of the first aspect, or make a network device to perform the method according to the second aspect or any possible implementation of the second aspect.

DESCRIPTION OF EMBODIMENTS

Figure 1:
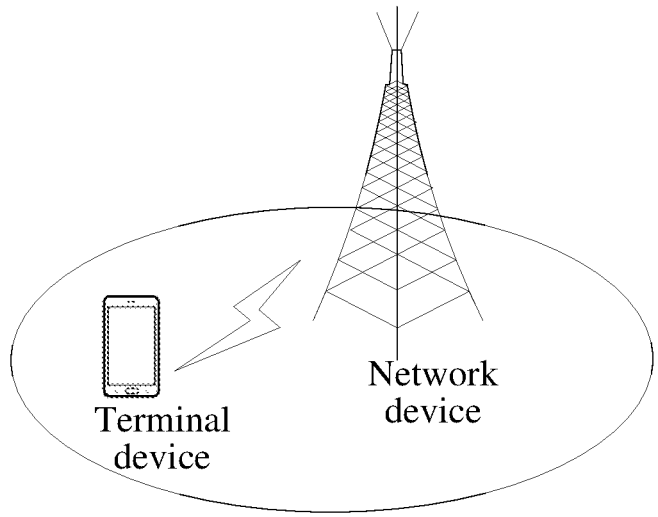
FIG. 1 is a schematic architecture diagram of a wireless communication system provided by an embodiment of the present disclosure.

The following will describe technical solutions of embodiments of the present disclosure in combination with the drawings in the embodiments of the present disclosure. Obviously, the described embodiments are only part of the embodiments of the present disclosure, rather than all of them. All other embodiments obtained by those skilled in the art without creative efforts based on the embodiments of the present disclosure belong to the protection scope of the present disclosure.

In the embodiments of the present disclosure, words, such as "illustratively" or "for example", are used to represent an example, an instance, or an illustration. In the embodiments of the present disclosure, any embodiment or any design scheme described as "illustratively" or "for example" should not be interpreted as more preferred or advantageous than other embodiments or design schemes. Specifically, the use of words such as "illustratively" or "for example" is intended to present relevant concepts in a specific way.

The terminal device in the embodiments of the present disclosure may be called a user equipment (UE), an access terminal, a user unit, a user station, a mobile station, a mobile platform, a remote station, a remote terminal, a mobile device, a user terminal, a terminal, a wireless communication device, a user agent or a user apparatus. The terminal device may be a station (ST) in a WLAN, may be a cellular phone, a cordless phone, a session initiation protocol (SIP) phone, a wireless local loop (WLL) station, a personal digital process (PDA) device, a handheld device with wireless communication functions, a computing device; or other processing devices connected to a wireless modem, an on-board device, a wearable device; a next-generation communication system, such as a terminal device in a NR network, or a terminal device in the future evolution of Public Land Mobile Network (PLMN) network.

In the embodiments of the present disclosure, the terminal device may be deployed on land, including indoor or outdoor, handheld, wearable or on-board; it may also be deployed on the surface of water (such as ships); it may also be deployed in the air (such as an aircraft, a balloon, a satellites, etc.). In the embodiments of the present disclosure, the terminal device may be a mobile phone, a tablet (Pad), a computer with wireless transceiver functions, a virtual reality (VR) terminal device, an augmented reality (AR) terminal device, a wireless terminal device in industrial control, a wireless terminal device in self driving, a wireless terminal device in remote medical, a wireless terminal device in smart grid, a wireless terminal device in smart grid, a wireless terminal device in transportation safety, a wireless terminal device in smart city, or a wireless terminal device in smart home, and so on.

As an example rather than a limitation, in the embodiment of the present disclosure, the terminal device may also be a wearable device. The wearable devices may also be called a wearable intelligent device, which is the general name of wearable devices developed by applying wearable technology to intelligently design daily wear, such as glasses, gloves, watches, clothing and shoes. The wearable device is a portable device that is directly worn on the body or integrated into user's clothes or accessories. The wearable device is not only a hardware device, but also realizes powerful functions through software support, data interaction and cloud interaction. A wearable smart device in broad sense includes full functions, large size, and complete or partial functions that can be realized without relying on smart phones, for example: smart watches, or smart glasses, and so on, and only focus on a certain type of application functions which needs to be used together with other devices (e.g. Smart phones), such as various smart bracelets and smart jewelry for physical sign monitoring.

The network device may be an access network device. The access network device may be an evolutional node B (an abbreviation may be eNB or e-NodeB), a macro base station, a micro base station (also called "mini base station"), a pico base station, an access point (AP), a transmission point (TP), or a new generation NodeB (gNodeB) etc. in a long-term evolution (LTE) system, a next radio (mobile communication system) (NR) system, or an authorized auxiliary access long-term evolution (LAA-LTE) system.

In the embodiments of the present disclosure, the network device may be a device used to communicate with a mobile device, the network device may be an access point (AP) in WLAN, a base transceiver station (BTS) in GSM or CDMA, may also be a base station (NodeB, NB) in WCDMA, may further be an evolutionary base station (Evolutional Node B, eNB or eNodeB) in LTE, or a relay station or an access point, or an on-board device, a wearable device and a network device (gNB) in a NR network or a network device in a further evolved PLMN network, or a network device in a NTN network.

In the embodiments of the present disclosure, the network device can provide services for a cell, the terminal device communicates with the network device through transmission resources used by the cell (e.g., frequency domain resources, or spectrum resources). The cell may a cell corresponding to the network device (e.g., a base station), the cell may belong to a macro station, may also belong to a base station corresponding to a small cell. The small cell here may include: a metro cell, a micro cell, a pico cell, a femto cell, and so on. These small cells have characteristics of small coverage range and low transmission power, and are suitable for providing high speed data transmission services.

The technical solutions of the embodiments of the present disclosure can be applied in various communication systems, for example, a global system of mobile communication (GSM) system, a code division multiple access (CDMA) system, a wideband code division multiple access (WCDMA) system, a general packet radio service (GPRS), a long term evolution (LTE) system, an advanced long term evolution (LTE-A) system, a new radio (NR) system, an evolutional system of the NR system, a LTE-based access to unlicensed spectrum (LTE-U) system, a NR-based access to unlicensed spectrum NR-U) system, a non-terrestrial network (NTN) system, a universal mobile telecommunication system (UMTS), a wireless local area network (WLAN), a wireless fidelity (WiFi), a 5th-generation (5G) system, or other communication systems, and so on.

The communication system in the embodiments of the present disclosure can be applied in a carrier aggregation (CA) scenario, or in a dual connectivity (DC) scenario, or in a standalone (SA) networking scenario. In an embodiment, the communication system in the embodiments of the present disclosure can be applied in an unauthorized spectrum, where the unauthorized spectrum may also be considered as a shared spectrum; or, the communication system in the embodiments of the present disclosure can be applied in an authorized spectrum, where the authorized spectrum may also be considered as a non-shared spectrum It should be understood that, the terms "system" and "network" herein are often used interchangeably. The term "and/or" herein is only an association relationship describing associated objects, and means that there may be three kinds of relationships. For example, the expression "A and/or B" may indicate three situations: A exists alone, both A and B exist at the same time, and B exists alone. In addition, the character "/" herein generally indicates that the associated objects before and after the character are in an "or" relationship.

It should be understood that, the "indication" mentioned in the embodiments of the present application may be a direct indication, or an indirect indication, or represents that there is an association relationship. Taking examples for illustration, A indicates B, which may indicate that A indicates B directly, for example, B can be obtained through A; which may also indicate that A indicates B indirectly, for example, A indicates C, and B can be obtained through C; which may also indicate that there is an association relationship between A and B.

In the description of the embodiments of the present disclosure, the term "correspond" can indicate that there is a direct or indirect correspondence relationship between the two, or that there is an association relationship between the two, or that there is a relationship between indicating and being indicated, configuring and being configured.

In an embodiment, instruction information in the embodiments of the present disclosure includes at least one of physical layer signals, such as downlink control information (DCI), a radio resource control (RRC) signaling, and a media access control element (MAC CE).

In an embodiment, an upper layer parameter or an upper layer signaling in the embodiments of the present disclosure includes at least one of a radio resource control (RRC) signaling and a media access control element (MAC CE).

In related arts, strong demands of the vertical market for wireless communication is obvious to all. In order to meet the demands of the vertical industry for delay, mobility, reliability, location accuracy, etc., the radio access network (RAN) needs to enhance how to support vertical services in the access network. Among them, one way is that, based on a network slicing, services with lower delay, more targeted, greater flexibility, and higher scalability for multiple services with different requirements are provided. More specifically, RAN slicing allows application providers to participate in the design, deployment and operation of customized RAN, to better support the business of application providers. Therefore, Release 17 introduces the enhancement of the access network to slicing, which specifically involves the following content:

This topic aims to discuss the enhancement of RAN support by network slicing; the detailed objective of the research project is to study the mechanism that enables a UE to quickly access a cell supporting the predetermined slicing, including wireless access network group 2 [RAN2]:
  a. cell re-selection based on the slicing under network control;
  b. RACH (Random Access Channel) configuration or access restrictions based on slicing.

Note: study whether an existing mechanism can meet this situation or demand.

Slicing in Rel-15 only involves a core network side. Specifically, the terminal device can report a slicing requirement to the network device, and the network selects an appropriate access and mobility management function (AMF) according to the slicing requirement reported by UE, to establish a business session between the terminal device and the network.

In related arts, during the RRC connection establishment procedure, a network device can only know slicing information required by a terminal device after receiving the RRC connection establishment completion message (i.e. msg5). However, the slicing information required by the terminal device may not be the slicing supported by the network device, or the slicing is overloaded even though it is the slicing supported by the network device, at this time, the network device can only send an RRC release message to the terminal device after the msg5, and the network device can indicate a wait time at the same time to indicate the UE that no access attempt should be made in a current cell any more during the wait time (since this cell does not support this slicing; or, this cell supports this slicing, but this slicing is overloaded), in order to avoid the terminal device frequently trying an inappropriate cell because it cannot be accessed even trying.

In related arts, the wait time is only for the current cell. However, according to the slicing deployment in the R17 communication standard, a network slicing is usually the same in one area (such as the TA area) or frequency point. That is to say, if it is not supported in this current cell, it should also not be supported in a corresponding area or frequency point of this cell. Therefore, there is no need for the terminal device making another access attempt in other areas of this area or frequency point. While, according to an existing indication mode, it will cause unnecessary behavior overhead of the terminal device and constantly trigger a connection establishment or a recovery process, resulting in high power consumption of the terminal device and the network device.

Based on above problems, the embodiments of the present disclosure provide a wireless communication method, in the method, the network device can send a first indication information used to prevent the terminal device from an access attempt or camping to the terminal device, where the first indication information may include at least one information of wait time information, applicable scope information, and a common use indication. In this way, the terminal device can perform an access attempt or camping according to the first indication information, so as to learn a range into which not performing the access attempt or the camping according to the first indication information, and to learn whether to perform the access attempt or the camping within a range of the area, the frequency point, and others corresponding to this cell. So that, constantly triggering a connection establishment or a recovery process can be avoided, and the power consumption of the terminal device and the network device is decreased.

The wireless communication method provided by the embodiments of the present disclosure can be applied in a wireless communication system shown in FIG. 1. In FIG. 1, the wireless communication system includes a terminal device and a network device. In practical applications, a connection between the above terminal device and network device may be a wireless connection. When the wireless communication method provided by the embodiments of the present disclosure is applied in the wireless communication system shown in FIG. 1, the network device can send the first indication information used to prevent the terminal device from an access attempt or camping, where the first indication information includes at least one information of wait time information, applicable scope information, and a common use indication. In this way, the terminal device can perform an access attempt or camping according to the first indication information, so as to learn a range into which not performing the access attempt or the camping according to the first indication information, and to learn whether to perform the access attempt or the camping within a range of the area, the frequency point, and others corresponding to this cell. So that, constantly triggering a connection establishment or a recovery process can be avoided, and the power consumption of the terminal device and the network device is decreased.

Figure 2:
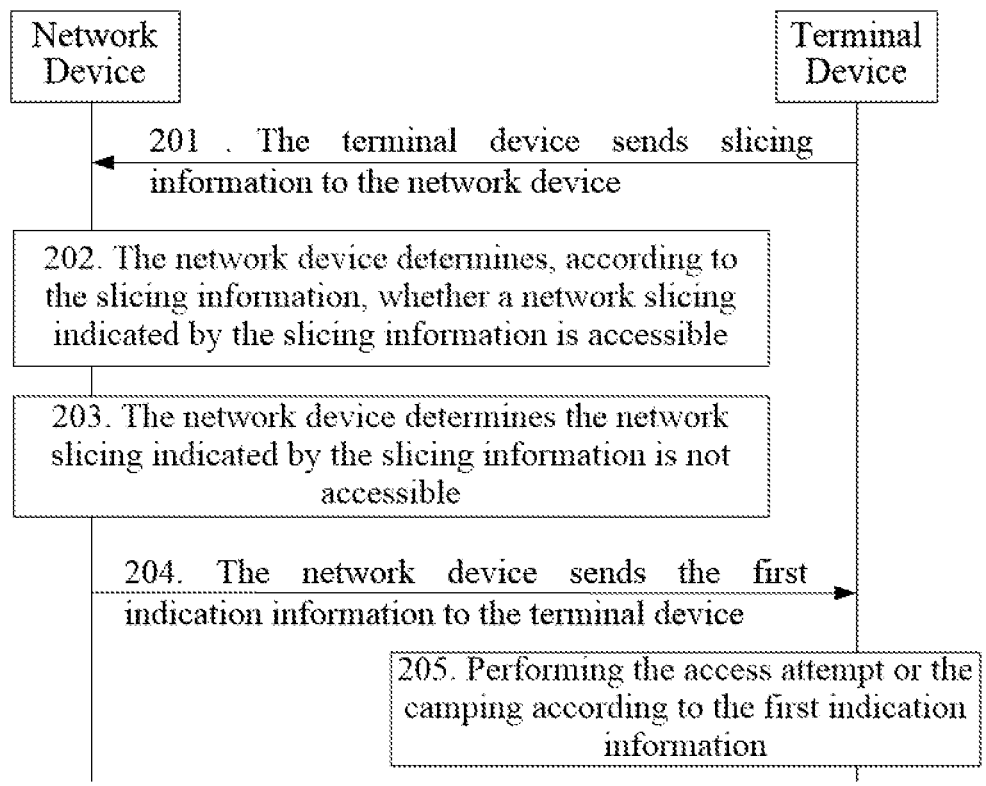
FIG. 2 is a schematic diagram of a wireless communication method provided by an embodiment of the present disclosure.

As shown in FIG. 2, an embodiment of the present disclosure provides a wireless communication method, the method includes:

201, a terminal device sends slicing information to a network device.

In an embodiment, in the embodiments of the present disclosure, a RRC connection establishment procedure or a RRC resume procedure is performed between the terminal device and the network device, and required slicing information can be carried in msg5 to the network device. In an embodiment, in other embodiments, when other procedures are performed between the terminal device and the network device, and the required slicing information can be sent to the network device through other information.

Illustratively, the slicing information required by the terminal device can also be sent, through msg1, msg3, msgA, an RRC resume request, and an RRC connection establishment request, etc., to the network device.

In an embodiment, when the slicing information required by the terminal device is sent to the network device through the RRC resume request, the slicing information required by the terminal device can be sent, specifically through a cause value (cause) in the RRC resume request, to the network device.

In an embodiment, when the slicing information required by the terminal device is sent to the network device through the RRC connection establishment request, the slicing information required by the terminal device can be sent, specifically through a cause value (cause) in the RRC connection establishment request, to the network device.

In an embodiment, in the embodiments of the present disclosure, the terminal device is in an idle state (idle), or, the terminal device is in an inactive state (inactive).

It should be noted that, the above slicing information may also be carried in a new configured message to be sent to the network device, or, the above slicing information may be carried in any other existing message to be sent to the network device, which is not limited in the embodiments of the present disclosure.

In an embodiment, the above slicing information may be an identification of the network slicing, an index of the network slicing, a serial number of the network slicing, or other information that can indicate the network slicing. In the embodiments of the present disclosure, the specific form of the slicing information is not limited.

202, the network device determines, according to the slicing information, whether a network slicing indicated by the slicing information is accessible.

For example, the network device determines, according to load information of an AMF corresponding to the slicing information, a load state of the network slicing indicated by the slicing information.

Illustratively, after obtaining the slicing information sent by the terminal device, the network device can learn the network slicing required by the terminal device, and determine an appropriate AMF, i.e. an AMF supporting the network slicing. After determining the AMF, according to load information of the obtained AMF, load information corresponding to the network slicing (i.e. the network slicing indicated by the slicing information) is obtained, and whether the network slicing is overloaded is determined.

In an embodiment, the load information of the AMF can be obtained before determining the AMF, or can be obtained by requesting after determining the AMF.

In an embodiment, the above load information of the AMF can be obtained by following possible ways:
one possible implementation way is: receiving the load information of the AMF sent by the AMF which supports the network slicing, to obtain the load information of the AMF;
another possible implementation way is: receiving the load information of the AMF which supports the network slicing sent by other devices, to obtain the load information of the AMF.

203, the network device determines the network slicing indicated by the slicing information is not accessible.

For example, the network device determines the network slicing indicated by the slicing information is overloaded.

If the network device determines the network slicing indicated by the slicing information is not accessible, the network device can send first indication information to the terminal device.

Illustratively, if the network device determines the network slicing indicated by the slicing information is overloaded, the network device can send the first indication information to the terminal device. That is, if the network device determines the network slicing required by the terminal device is overloaded, the network device can send the first indication information to the terminal device.

In an embodiment, another possible situation is: the network device can determine whether the network device supports the network slicing indicated by the slicing information, then send the first indication information to the terminal device if the network device does not support the network slicing indicated by the slicing information.

204, the network device sends the first indication information to the terminal device.

The first indication information is used to prevent the terminal device from an access attempt or camping. It can also be understood as that, the first indication information is used to indicate the terminal device not to perform the access attempt or not to camp, or, the first indication information is used to indicate the terminal device to stop the access attempt or the camping, or, the first indication information is used to indicate the terminal device to suspend the access attempt or the camping.

The first indication information includes at least one of following information:
1. Waiting time information;
2. Applicable scope information; and
3. A common use indication.

In an embodiment, the above wait time information includes at least one of:
(A) a wait duration;
(B) a wait end time; and
(C) a wait start time.

In an embodiment, the above applicable scope information includes at least one of:

(1) at least one tracking area code (TA code);
(2) at least one radio access network area code (RAN area code);
(3) at least one cell identity;
(4) at least one frequency point information (frequency); and
(5) at least one public land mobile network identity (PLMN ID).

In an embodiment, some information of the above applicable scope information may also be implemented in a form of a list.

Illustratively, the above 5 information can be implemented in following forms:
the above (1) corresponds to a tracking area code list (TA code list);
the above (2) corresponds to a radio access network area code list (RAN area code list);
the above (3) corresponds to a cell identity list;
the above (4) corresponds to a frequency point information list (frequency list); and
the above (5) corresponds to a public land mobile network identity list (PLMN identity list).

In an embodiment, the above common use indication is used to indicate whether the access attempt or the camping is allowed within a target range;
the target range includes at least one of:
(a) a same frequency point with a current cell;
(b) locating in a same tracking area with the current cell;
(c) locating in a same radio access network area with the current area;
(d) locating in a same public land mobile network with the current cell; and
(e) a second public land mobile network equivalent to a first public land mobile network where the current cell is located.

In an embodiment, the current cell may be included within the above target range, or, the current cell may not be included within the above target range.

In an embodiment, the above target range may be explicitly carried in the first indication information, or may be defaulted, e.g. pre-agreed in a communication protocol.

In an embodiment, using the common use indication to indicate whether an access attempt or camping is allowed within the target range includes a variety of possible situations:
a first possible situation is: the first indication information includes the common use indication, which represents that the access attempt or the camping is not allowed within the target range;
a second possible situation is: the first indication information does not include the common use indication, which represents that the access attempt or the camping is allowed within the target range;
a third possible situation is: the first indication information includes the common use indication, which represents that the access attempt or the camping is allowed within the target range;
a fourth possible situation is: the first indication information does not include the common use indication, which represents that the access attempt or the camping is not allowed within the target range;
a fifth possible situation is: the first indication information includes the common use indication, and the common use indication is used to indicate that the access attempt or the camping is not allowed within the target range; and
a sixth possible situation is: the first indication information includes the common use indication, and the common use indication is used to indicate that the access attempt or the camping is allowed within the target range.

In an embodiment, the common use indication is used to indicate whether the access attempt or the camping is allowed within a target range specifically through a field, an identity, or a value, and so on.

Illustratively, the common use indication is a field "allowed" which indicates that the access attempt or the camping is not allowed within the target range; the common use indication is a field "notallowed" which indicates that the access attempt or the camping is allowed within the target range; or, the common use indication is a field "allowed" which indicates that the access attempt or the camping is allowed within the target range; the common use indication is a field "notallowed" which indicates that the access attempt or the camping is not allowed within the target range.

For another example, a value of the common use indication is 1 which indicates that the access attempt or the camping is not allowed within the target range; the value of the common use indication is 0 which indicates that the access attempt or the camping is allowed within the target range.

In an embodiment, an allowable duration may also be indicated in the first indication information.

Furthermore, in combination with the above allowable duration, and one of the above second possible situation, the above third possible situation, and the sixth possible situation, that the access attempt or the camping is allowed within the allowable duration and within the target range can be indicated.

In an embodiment, the allowable duration may be smaller than or equal to a duration set in the wait time information (i.e. a wait duration below).

In an embodiment, the allowable duration may be a period of time within a range of the wait duration.

In an embodiment, the above first indication information can be carried in at least one of the following messages:
a radio resource control RRC message, a system message, a media access control control element MAC CE, and downlink control information DCI.

In an embodiment, the above RRC message is an RRC release message.

It should be noted that, in the embodiments of the present application, the above first indication information may also be sent by other messages, which is not limited in the embodiments of the present disclosure.

205, performing the access attempt or the camping according to the first indication information.

In an embodiment, performing the access attempt or the camping according to the first indication information may includes one or more of the following situations:
situation 1: performing no access attempt or no camping within a range indicated by the applicable range information, if the first indication information at least includes the applicable range information;
situation 2: performing no access attempt or no camping before a target time, if the first indication information at least includes the wait time information; where the target time is determined according to the wait time information;
situation 3: performing no access attempt or no camping before the target time and within the range indicated by the applicable range information, if the first indication information at least includes the applicable range information and the wait time information.

In an embodiment, when determining the target time according to the wait time information, there are several possible ways to achieve it:

first one: the wait time information includes the wait duration, then an end time of the wait duration can be determined as the above target time.

In an embodiment, a timer can be set, a timing duration of the timer is the wait duration, an expiry time of the timer is the target time; that is, before the timer expires, no access attempt or no camping is performed.

Second one: the wait time information includes the wait start time, then a time after a preset duration passed from the wait start time can be determined as the above target time.

The preset duration may be configured by the network device, or may be pre-agreed in a communication protocol.

Third one: the wait time information includes the wait end time, then the wait end time can be determined as the above target time.

It can be understood that, in addition to the above three situations, the target time can also be determined according to two or three of the wait time information.

Situation 4: performing no access attempt or no camping within the target range, if the first indication information at least includes the common use indication.

Situation 5: performing the access attempt or the camping within the target range, if the first indication information at least includes the common use indication.

Situation 6: performing the access attempt or the camping within the target range, if the first indication information does not include the common use indication.

Situation 7: performing no access attempt or no camping within the target range, if the first indication information at least includes the common use indication.

Situation 8: performing no access attempt or no camping within the target range, if the first indication information at least includes the common use indication and the common use indication is used to indicate that the access attempt or the camping within the target range is not allowed.

Situation 9: performing the access attempt or the camping within the target range, if the first indication information at least includes the common use indication and the common use indication is used to indicate that the access attempt or the camping within the target range is allowed.

Furthermore, performing no access attempt or no camping within the target range before the target time can be determined, in combination with the above wait time information, and in combination with any of the above situation 4, situation 7, and situation 8.

Furthermore, performing the access attempt or the camping within the target range within the above allowable duration can be determined, in combination with the above allowable duration, and in combination with any of the above situation 5, situation 6, and situation 9.

The embodiments of the present disclosure provide a wireless communication method, in the method, the network device can send a first indication information used to prevent the terminal device from an access attempt or camping to the terminal device, where the first indication information may include at least one information of wait time information, applicable scope information, and a common use indication. In this way, the terminal device can perform an access attempt or camping according to the first indication information, so as to learn a range into which not performing the access attempt or camping according to the first indication information, and to learn whether to perform the access attempt or camping within a range of the area, the frequency point, and others corresponding to this cell. So that, constantly triggering a connection establishment or a recovery process can be avoided, and the power consumption of the terminal device and the network device is decreased.

Figure 3:
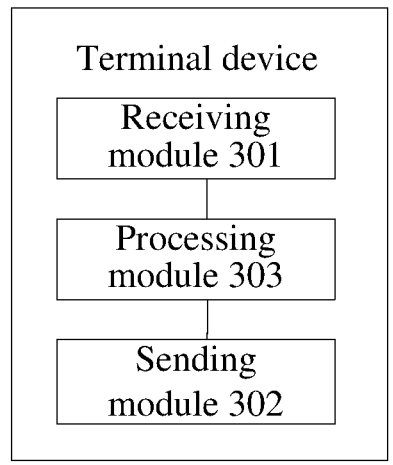
FIG. 3 is a schematic structural diagram of a terminal device provided by an embodiment of the present disclosure.

As shown in FIG. 3, an embodiment of the present disclosure provides a terminal device, including:

a receiving module 301, configured to receive first indication information sent by a network device, where the first indication information is used to prevent the terminal device from an access attempt or camping, and the first indication information includes at least one of following information:

wait time information, applicable scope information, and a common use indication.

In an embodiment, the applicable scope information includes at least one of:

at least one tracking area code, at least one radio access network area code, at least one cell identity, at least one frequency point information, and at least one public land mobile network identity.

In an embodiment, the common use indication is used to indicate whether the access attempt or the camping is allowed within a target range;

the target range includes at least one of:

a same frequency point with a current cell, locating in a same tracking area with the current cell, locating in a same radio access network area with the current area, locating in a same public land mobile network with the current cell, and a second public land mobile network equivalent to a first public land mobile network where the current cell is located.

In an embodiment, the wait time information includes at least one of:

a wait duration, a wait end time, and a wait start time.

In an embodiment, the terminal device further includes: a sending module 302, configured to send slicing information to the network device before the receiving module 301 receives the first indication information sent by the network device.

In an embodiment, the terminal device further includes: a processing module 303, configured to perform the access attempt or the camping according to the first indication information after the receiving module 301 receives the first indication information sent by the network device.

In an embodiment, the processing module 303 is specifically configured to perform no access attempt or no camping within a range indicated by the applicable range information, if the first indication information at least includes the applicable range information.

In an embodiment, the processing module 303 is specifically configured to perform no access attempt or no camping before a target time, if the first indication information at least includes the wait time information; where the target time is determined according to the wait time information.

In an embodiment, the processing module 303 is specifically configured to perform no access attempt or no camping within the target range, if the first indication information at least includes the common use indication.

In an embodiment, the processing module 303 is specifically configured to perform no access attempt or no camping within the target range, if the first indication information at least includes the common use indication and the common use indication is used to indicate that the access attempt or the camping within the target range is not allowed.

In an embodiment, the processing module 303 is specifically configured to perform the access attempt or the camping within the target range, if the first indication information at least does not include the common use indication.

In an embodiment, the processing module 303 is specifically configured to perform the access attempt or the camping within the target range, if the first indication information at least includes the common use indication and the common use indication is used to indicate that the access attempt or the camping within the target range is allowed.

In an embodiment, the terminal device is in an idle state, or, the terminal device is in an inactive state.

In an embodiment, the first indication information is carried by at least one of the following messages:
 a radio resource control RRC message, a system message, a media access control control element MAC CE, and downlink control information DCI.

In an embodiment, the RRC message is an RRC release message.

Figure 4:
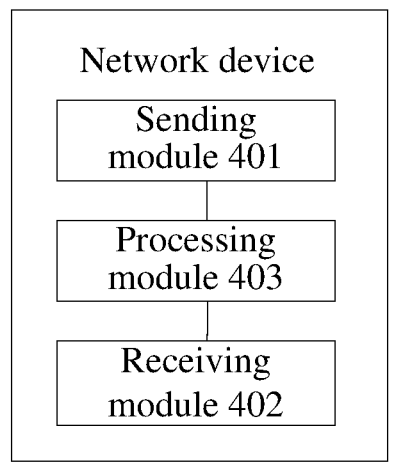
FIG. 4 is a schematic structural diagram of a network device provided by an embodiment of the present disclosure.

As shown in FIG. 4, an embodiment of the present disclosure provides a network device, the network device includes:
 a sending module 401, configured to send a first indication information to a terminal device, where the first indication information is used to prevent the terminal device from an access attempt or camping, and the first indication information includes at least one of following information:
 wait time information, applicable scope information, and a common use indication.

In an embodiment, the applicable scope information includes at least one of:
 at least one tracking area code, at least one radio access network area code, at least one cell identity, at least one frequency point information, and at least one public land mobile network identity.

In an embodiment, the common use indication is used to indicate whether the access attempt or the camping is allowed within a target range;
 the target range includes at least one of:
 a same frequency point with a current cell, locating in a same tracking area with the current cell, locating in a same radio access network area with the current area, locating in a same public land mobile network with the current cell, and a second public land mobile network equivalent to a first public land mobile network where the current cell is located.

In an embodiment, the wait time information includes at least one of:
 a wait duration, a wait end time, and a wait start time.

In an embodiment, the network device further includes: a receiving module 402, configured to receive slicing information sent by the terminal device before the sending module sends the first indication information to the terminal device.

In an embodiment, the sending module 401 is specifically configured to send the first indication information to the terminal device if the network device does not support a network slicing indicated by the slicing information.

In an embodiment, the sending module 401 is specifically configured to send the first indication information to the terminal device if the network device determines a network slicing indicated by the slicing information is overloaded.

In an embodiment, the network device further includes: a processing module 403, configured to determine, according to load information of an AMF corresponding to the slicing information, a load state of the network slicing indicated by the slicing information, before the sending module 404 sends the first indication information to the terminal device if the network device determines the network slicing indicated by the slicing information is overloaded.

In an embodiment, the terminal device is in an idle state, or, the terminal device is in an inactive state.

In an embodiment, the first indication information is carried in at least one of the following messages:
 a radio resource control RRC message, a system message, a media access control control element MAC CE, and downlink control information.

In an embodiment, the RRC message is an RRC release message.

An embodiment of the present disclosure further provides a terminal device, including: a memory storing executable program codes; and
 a processor coupled with the memory;
 where the processor calls the executable program codes stored in the memory, to execute the wireless communication method of the terminal device side in the embodiments of the present disclosure.

An embodiment of the present disclosure further provides a network device, including: a memory storing executable program codes; and
 a processor coupled with the memory;
 where the processor calls the executable program codes stored in the memory, to execute the wireless communication method of the network device side in the embodiments of the present disclosure.

Figure 5:
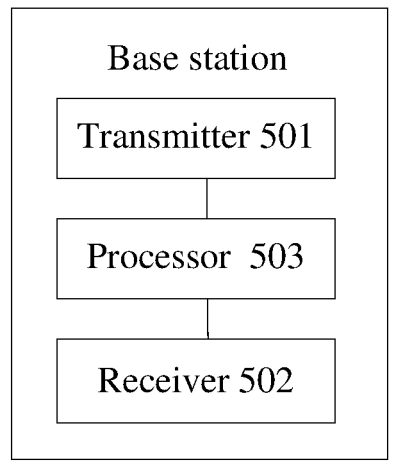
FIG. 5 is a schematic structural diagram of a base station provided by an embodiment of the present disclosure.

Illustratively, as shown in FIG. 5, the network device in an embodiment of the present disclosure may be a base station, the base station includes:
 a transmitter 501, configured to send a first indication information to a terminal device, where the first indication information is used to prevent the terminal device from an access attempt or camping, and the first indication information includes at least one of following information:
 wait time information, applicable scope information, and a common use indication.

In an embodiment, the applicable scope information includes at least one of:
 at least one tracking area code, at least one radio access network area code, at least one cell identity, at least one frequency point information, and at least one public land mobile network identity.

In an embodiment, the common use indication is used to indicate whether the access attempt or the camping is allowed within a target range;
 the target range includes at least one of:
 a same frequency point with a current cell, locating in a same tracking area with the current cell, locating in a same radio access network area with the current area, locating in a same public land mobile network with the current cell, and a second public land mobile network equivalent to a first public land mobile network where the current cell is located.

In an embodiment, the wait time information includes at least one of:
 a wait duration, a wait end time, and a wait start time.

In an embodiment, the base station further includes: a receiver 502, configured to receive slicing information sent by the terminal device before the sending module sends the first indication information to the terminal device.

In an embodiment, the transmitter 501 is specifically configured to send the first indication information to the terminal device if the network device does not support a network slicing indicated by the slicing information.

In an embodiment, the transmitter 501 is specifically configured to send the first indication information to the terminal device if the network device determines a network slicing indicated by the slicing information is overloaded.

In an embodiment, the base station further includes: a processor 503, configured to determine, according to load information of an AMF corresponding to the slicing information, a load state of the network slicing indicated by the slicing information, before the transmitter 501 sends the first indication information to the terminal device if the network device determines the network slicing indicated by the slicing information is overloaded.

In an embodiment, the terminal device is in an idle state, or, the terminal device is in an inactive state.

In an embodiment, the first indication information is carried in at least one of the following messages:

a radio resource control RRC message, a system message, a media access control control element MAC CE, and downlink control information DCI.

In an embodiment, the RRC message is an RRC release message.

Figure 6:
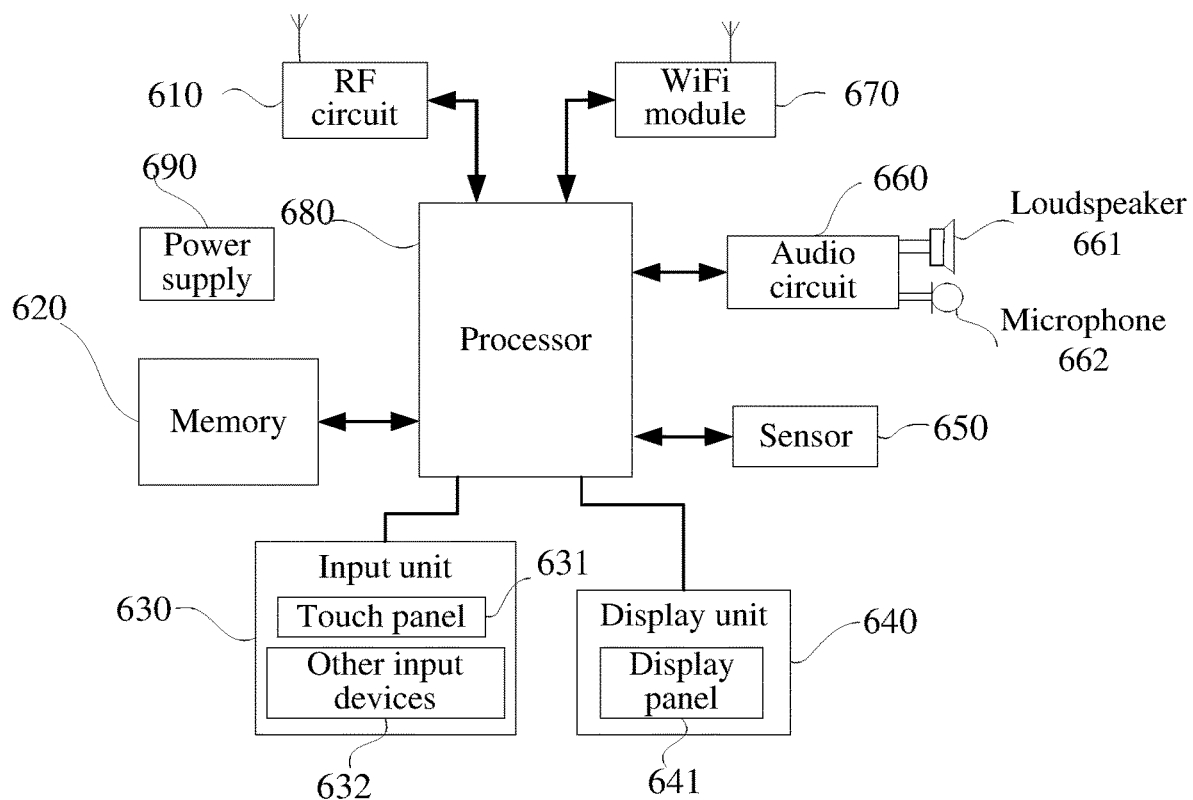
FIG. 6 is a schematic structural diagram of a mobile phone provided by an embodiment of the present disclosure.

Illustratively, the terminal device in an embodiment of the present disclosure may be a mobile phone. As shown in FIG. 6, the mobile phone may include: a radio frequency (RF) circuit 610, a memory 620, an input unit 630, a display unit 640, a sensor 650, an audio circuit 660, a wireless fidelity (WiFi) module 670, a processor 680, and a power supply 690, etc. Among them, the radio frequency circuit 610 includes a receiver 611 and a transmitter 612. Those skilled in the art can understand that, the mobile phone structure shown in FIG. 6 does not constitute a limitation to the mobile phone, which may include more or less components than that shown in the figure, or combine some components, or a different component configuration.

The RF circuit 610 can be used to receive and send information, or, receive and send signals during a call; in particular, after a reception of downlink information of the base station, send it to the processor 680 for processing; in addition, send designed uplink data to the base station. Generally, the RF circuit 610 includes, but not limited to, an antenna, at least one amplifier, a transceiver, a coupler, low noise amplifier (LNA), a duplexer, etc. In addition, the RF circuit 610 can also communicate with networks and other devices through wireless communication. Any communication standard or protocol can be used for the above wireless communication, including, but not limited to, global system of mobile communication (GSM), general packet radio service (GPRS), code division multiple access (CDMA), broadband code division multiple access (WCDMA), long term evolution (LTE), E-mail, short messaging service (SMS), etc.

The memory 620 can be used to store a software program and a module, and the processor 680 can execute various functional applications and data processing of the mobile phone by running the software program and the module stored in the memory 620. The memory 620 may mainly include a storage program area and a storage data area, where the storage program area can store an operating system, an application program required by at least one function (such as a sound playing function, an image playing function, etc.), etc.; the storage data area can store data (such as audio data, a phonebook, etc.) created according to the use of mobile phones. In addition, the memory 620 may include a high-speed random access memory, and may also include a nonvolatile memory, such as at least one disk storage device, a flash memory device, or other volatile solid-state storage devices.

The input unit 630 can be used to receive input digital or character information, and generate a key signal input related to user settings and function control of the mobile phone. Specifically, the input unit 630 may include a touch panel 631 and other input devices 632. The touch panel 631, also known as a touch screen, can collect a user's touch operation on or near the touch panel 631 (such as the user's operation on or near the touch panel 631 with any suitable object or accessory such as finger, stylus, etc.), and drive a corresponding connection device according to a preset program. In an embodiment, the touch panel 631 may include two parts of a touch detection device and a touch controller. Among them, the touch detection device detects a user's touch orientation, detects a signal brought by the touch operation, and transmits the signal to the touch controller; the touch controller receives the touch information from the touch detection device, converts it into contact coordinates, then sends it to the processor 680, and can receive and execute commands from the processor 680. In addition, the touch panel 631 can be implemented by using a resistance type, a capacitance type, an infrared ray, a surface acoustic wave and other types. In addition to the touch panel 631, the input unit 630 may also include other input devices 632. Specifically, other input devices 632 may include, but not limited to, one or more of a physical keyboard, a function key (such as a volume control key, a switch key, etc.), a trackball, a mouse, a joystick, and the like.

The display unit 640 can be used to display information input by a user or information provided to the user, and various menus of the mobile phone. The display unit 640 may include a display panel 641. In an embodiment, the display panel 641 may be configured in a form of liquid crystal display (LCD), organic light-emitting diode (OLED), etc. Furthermore, the touch panel 631 may cover the display panel 641. After the touch panel 631 detects a touch operation on or near the touch panel 631, it is transmitted to the processor 680 to determine a type of the touch event, and then the processor 680 provides corresponding visual output on the display panel 641 according to the type of the touch event. Although in FIG. 6, the touch panel 631 and the display panel 641 are two independent components to realize input and input functions of the mobile phone, in some embodiments, the touch panel 631 and the display panel 641 can be integrated to achieve the input and output functions of the mobile phone.

The mobile phone may also include at least one sensor 650, such as a light sensor, a motion sensor, and other sensors. Specifically, the light sensor may include an ambient light sensor and a proximity sensor, where the ambient light sensor can adjust luminance of the display panel 641 according to brightness and darkness of ambient light, and the proximity sensor can turn off the display panel 641 and/or backlight when the mobile phone moves to an ear. As a kind of motion sensor, an accelerometer sensor can detect magnitude of acceleration in all directions (generally three axes), detect magnitude and direction of gravity when stationary, and can be used to identify mobile phone posture applications (such as horizontal and vertical screen switching, related games, magnetometer posture calibration), vibration recognition related functions (such as pedometer, knocking), etc.; as for the gyroscope, barometer, hygrometer, thermometer, infrared sensor and other sensors that can also be configured on the mobile phone, will not be repeated here.

The audio circuit 660, a loudspeaker 661 and a microphone 662 can provide audio interface between users and mobile phones. The audio circuit 660 can transmit an electrical signal after received audio data is converted to the loudspeaker 661, and it is converted as a sound signal for output by the loudspeaker 661; on the other hand, the microphone 662 converts a collected sound signal into an electrical signal, which is received by the audio circuit 660 and converted into audio data, and after the audio data is output to the processor 680 for processing, and is sent to another mobile phone via the RF circuit 610, or is output to the memory 620 for further processing.

WiFi belongs to a short-range wireless transmission technology. The mobile phone can help users receive and send emails, browse web pages and access streaming media through the WiFi module 670. It provides users with wireless broadband Internet access. Although FIG. 6 shows the WiFi module 670, it can be understood that, it does not belong to a necessary composition of the mobile phone and can be omitted as needed without changing the essence of the disclosure.

The processor 680 is a control center of the mobile phone, which uses various interfaces and lines to connect various parts of the entire mobile phone, and performs various functions and processes data of the mobile phone, by running or executing software programs and/or modules stored in the memory 620 and calling data stored in the memory 620, so as to overall monitor the mobile phone. In an embodiment, the processor 680 may include one or more processing units. Preferably, the processor 680 can integrate an application processor and a modulation and demodulation processor, where the application processor mainly processes an operating system, a user interface, an application program, etc., and the modulation and demodulation processor mainly processes wireless communication. It can be understood that, the above modulation and demodulation processor may not be integrated into the processor 680.

The mobile phone also includes the power supply 690 (such as a battery) which supplies power to various components. Preferably, the power supply can be logically connected to the processor 680 through a power management system, so as to manage charging, discharging, power consumption management and other functions through the power management system. Although not shown, the mobile phone may also include a camera, a Bluetooth module, etc., which will not be repeated here.

In the embodiment of the present disclosure, the RF circuit 610 is configured to receive first indication information sent by a network device, where the first indication information is used to prevent the terminal device from an access attempt or camping, and the first indication information includes at least one of following information:
wait time information, applicable scope information, and a common use indication.

In an embodiment, the applicable scope information includes at least one of:
at least one tracking area code, at least one radio access network area code, at least one cell identity, at least one frequency point information, and at least one public land mobile network identity.

In an embodiment, the common use indication is used to indicate whether the access attempt or the camping is allowed within a target range;
the target range includes at least one of:
a same frequency point with a current cell, locating in a same tracking area with the current cell, locating in a same radio access network area with the current area, locating in a same public land mobile network with the current cell, and a second public land mobile network equivalent to a first public land mobile network where the current cell is located.

In an embodiment, the wait time information includes at least one of:
a wait duration, a wait end time, and a wait start time.

In an embodiment, the RF circuit 610 is further configured to send slicing information to the network device before receiving the first indication information sent by the network device.

In an embodiment, the processing module 680 is further configured to perform the access attempt or the camping according to the first indication information after the RF circuit 610 receives the first indication information sent by the network device.

In an embodiment, the processing module 680 is specifically configured to perform no access attempt or no camping within a range indicated by the applicable range information, if the first indication information at least includes the applicable range information.

In an embodiment, the processing module 680 is specifically configured to perform no access attempt or no camping before a target time, if the first indication information at least includes the wait time information; where the target time is determined according to the wait time information.

In an embodiment, the processing module 680 is specifically configured to perform no access attempt or no camping within the target range, if the first indication information at least includes the common use indication.

In an embodiment, the processing module 680 is specifically configured to perform no access attempt or no camping within the target range, if the first indication information at least includes the common use indication and the common use indication is used to indicate that the access attempt or the camping within the target range is not allowed.

In an embodiment, the processing module 680 is specifically configured to perform the access attempt or the camping within the target range, if the first indication information at least does not include the common use indication.

In an embodiment, the processing module 680 is specifically configured to perform the access attempt or the camping within the target range, if the first indication information at least includes the common use indication and the common use indication is used to indicate that the access attempt or the camping within the target range is allowed.

In an embodiment, the terminal device is in an idle state, or, the terminal device is in an inactive state.

In an embodiment, the first indication information is carried by at least one of the following messages:
a radio resource control RRC message, a system message, a media access control control element MAC CE, and downlink control information DCI.

In an embodiment, the RRC message is an RRC release message.

An embodiment of the present disclosure further provides a computer readable storage medium, including: a computer instruction, when it is operated on a computer, the computer is caused to perform the respective processes of the terminal device in the above method embodiments.

An embodiment of the present disclosure further provides a computer readable storage medium, including: a computer instruction, when it is operated on a computer, the computer is caused to perform the respective processes of the network device in the above method embodiments.

An embodiment of the present disclosure further provides a computer program product, including: a computer instruction, when the computer program product is operated on a computer, the computer operates the computer instruction, to cause the computer to perform the respective processes of the terminal device in the above method embodiments.

An embodiment of the present disclosure further provides a computer program product, including: a computer instruction, when the computer program product is operated on a computer, the computer operates the computer instruction, to cause the computer to perform the respective processes of the network device in the above method embodiments.

An embodiment of the present disclosure further provides a chip, the chip is coupled with a memory in a terminal device to cause the chip call a program instruction stored in the memory, so as to make the terminal device to perform the method according to the first aspect or any possible implementation of the first aspect, or make a network device to perform the respective processes of the terminal device in the above method embodiments.

An embodiment of the present disclosure further provides a chip, the chip is coupled with a memory in a network device to cause the chip call a program instruction stored in the memory, so as to make the terminal device to perform the method according to the first aspect or any possible implementation of the first aspect, or make a network device to perform the respective processes of the network device in the above method embodiments.

In the above embodiments, it can be implemented in whole or in part by software, hardware, firm ware or any combination thereof. When implemented by software, it can be implemented in a form of computer program products in whole or in part. A computer program product includes one or more computer instructions. When the computer program instruction is loaded and executed on a computer, a process or function according to the embodiments of the present disclosure is generated in whole or in part. The computer may be a general purpose computer, a special purpose computer, a computer network, or other programmable apparatus. The computer instruction can be stored in a computer readable storage medium, or transmitted from one computer readable storage medium to another computer readable storage medium. For example, the computer instruction can be transmitted from one website site, computer, server or data center to another website site, computer, server or data center through a wired (such as coaxial cable, optical fiber, digital subscriber line (DSL)) or wireless (such as infrared, wireless, microwave, etc.) way. The computer readable storage medium may be any available medium that can be stored by a computer or a data storage device including a server, a data center and the like integrated with one or more available media. The available media may be magnetic media (for example, floppy disk, hard disk, tape), optical media (for example, digital video disk (DVD)), or semiconductor media (for example, solid state disk (SSD)).

The terms "first", "second", "third", "fourth", etc. (if any) in the description, claims, and the above drawings of the present disclosure are used to distinguish similar objects, and need not be used to describe a specific order or sequence. It should be understood that, the data so used can be interchanged where appropriate, so that the embodiments described herein can be implemented in an order other than what is shown in the figures or what is described herein. In addition, the terms "include" and "have" and any variations thereof are intended to cover non-exclusive inclusion. For example, a process, method, system, product or device that contains a series of steps or units need not be limited to those steps or units that are clearly listed, but can include other steps or units that are not clearly listed or are inherent to these processes, methods, products or devices.

What is claimed is:

1. A wireless communication method, comprising:
receiving, by a terminal device, a first indication information sent by a network device, wherein the first indication information is used to prevent the terminal device from an access attempt or camping, and the first indication information comprises at least one of following information:
wait time information, applicable scope information, and a common use indication;
wherein after the receiving, by the terminal device, the first indication information, the method further comprises:
performing, by the terminal device, the access attempt or the camping according to the first indication information:
wherein the performing by the terminal device, the access attempt or camping according to the first indication information comprises;
performing, by the terminal device, no access attempt or no camping within a target range, if the first indication information at least comprises the common use indication and the common use indication is used to indicate that the access attempt or the camping within the target range is not allowed:
the target range comprises at least one of:
a same frequency point with a current cell, locating in a same tracking area with the current cell, locating in a same radio access network area with the current area, locating in a same public land mobile network with the current cell, and a second public land mobile network equivalent to a first public land mobile network where the current cell is located.

2. The method according to claim 1, wherein the applicable scope information comprises at least one of:
at least one tracking area code, at least one radio access network area code, at least one cell identity, at least one frequency point information, and at least one public land mobile network identity.

3. The method according to claim 1, wherein,
the common use indication is used to indicate whether the access attempt or the camping is allowed within the target range.

4. The method according to claim 1, wherein the wait time information comprises at least one of:
a wait duration, a wait end time, and a wait start time.

5. The method according to claim 1, wherein before the receiving the first indication information, the method further comprises:
sending slicing information to the network device.

6. The method according to claim 1, wherein after receiving, by the terminal device, the first indication information sent by the network device, the method further comprises:
performing, by the terminal device, no access attempt or no camping within a range indicated by the applicable scope information, if the first indication information at least comprises the applicable scope information.

7. The method according to claim 1, wherein after receiving, by the terminal device, the first indication information sent by the network device the method further comprises:
performing, by the terminal device, no access attempt or no camping before a target time, if the first indication information at least comprises the wait time information; wherein the target time is determined according to the wait time information.

8. The method according to claim 1, wherein after receiving, by the terminal device, the first indication information sent by the network device the method further comprises:
  performing, by the terminal device, no access attempt or no camping within the target range, if the first indication information at least comprises the common use indication.

9. The method according to claim 1, wherein after receiving, by the terminal device the first indication information sent by the network device the method further comprises:
  performing, by the terminal device, the access attempt or the camping within the target range, if the first indication information does not comprise the common use indication.

10. The method according to claim 1, wherein after receiving, by the terminal device, the first indication information sent by the network device, the method further comprises:
  performing, by the terminal device, the access attempt or the camping within the target range, if the first indication information at least comprises the common use indication and the common use indication is used to indicate that the access attempt or the camping within the target range is allowed.

11. The method according to claim 1, wherein the terminal device is in an idle state, or the terminal device is in an inactive state.

12. The method according to claim 1, wherein the first indication information is carried by at least one of following messages:
  a radio resource control (RRC) message, a system message, a media access control control element (MAC CE), and downlink control information (DCI).

13. The method according to claim 12, wherein the RRC message is an RRC release message.

14. A non-transitory computer readable storage medium, comprising: a computer instruction, when the computer instruction is operated on a computer, the computer is enabled to perform the method according to claim 1.

15. A terminal device, comprising:
  a receiver, configured to receive first indication information sent by a network device, wherein the first indication information is used to prevent the terminal device from an access attempt or camping, and the first indication information comprises at least one of following information:
  wait time information, applicable scope information, and a common use indication;
  wherein the terminal device further comprises a processor configured to perform no access attempt or no camping within a target range if the first indication information at least comprises the common use indication and the common use indication is used to indicate that the access attempt or the camping within the target range is not allowed;
  the target range comprises at least one of:
  a same frequency point with a current cell, locating in a same tracking area with the current cell, locating in a same radio access network area with the current area, locating in a same public land mobile network with the current cell, and a second public land mobile network equivalent to a first public land mobile network where the current cell is located.

16. The terminal device according to claim 15, wherein the applicable scope information comprises at least one of:
  at least one tracking area code, at least one radio access network area code, at least one cell identity, at least one frequency point information, and at least one public land mobile network identity.

17. The terminal device according to claim 15, wherein the common use indication is used to indicate whether the access attempt or the camping is allowed within the target range;
  the target range comprises at least one of:
  a same frequency point with a current cell, locating in a same tracking area with the current cell, locating in a same radio access network area with the current area, locating in a same public land mobile network with the current cell, and a second public land mobile network equivalent to a first public land mobile network where the current cell is located.

18. The terminal device according to claim 15, wherein the wait time information comprises at least one of:
  a waiting duration, a waiting end time, and a waiting start time.

19. The terminal device according to claim 15, further comprising:
  a transmitter, configured to send slicing information to the network device before the receiver receives the first indication information sent by the network device.

20. A network device, comprising:
  a transmitter, configured to send a first indication information to a terminal device, wherein the first indication information is used to prevent the terminal device from an access attempt or camping, and the first indication information comprises at least one of following information:
  wait time information, applicable scope information, and a common use indication;
  wherein no access attempt or no camping within a target range is performed by the terminal device, if the first indication information at least comprises the common use indication and the common use indication is used to indicate that the access attempt or the camping within the target range is not allowed;
  the target range comprises at least one of:
  a same frequency point with a current cell, locating in a same tracking area with the current cell, locating in a same radio access network area with the current area, locating in a same public land mobile network with the current cell, and a second public land mobile network equivalent to a first public land mobile network where the current cell is located.

* * * * *